US011704645B2

(12) United States Patent
Jooste

(10) Patent No.: US 11,704,645 B2
(45) Date of Patent: *Jul. 18, 2023

(54) PROCESSING PAYMENT TRANSACTIONS WITHOUT A SECURE ELEMENT

(71) Applicant: Google LLC, Mountain View, CA (US)

(72) Inventor: Sarel Kobus Jooste, Novato, CA (US)

(73) Assignee: GOOGLE LLC, Mountain View, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 17/351,763

(22) Filed: Jun. 18, 2021

(65) Prior Publication Data

US 2021/0390525 A1 Dec. 16, 2021

Related U.S. Application Data

(63) Continuation of application No. 16/853,344, filed on Apr. 20, 2020, now Pat. No. 11,042,861, which is a
(Continued)

(51) Int. Cl.
*G06Q 20/40* (2012.01)
*G06Q 20/20* (2012.01)
(Continued)

(52) U.S. Cl.
CPC ....... *G06Q 20/202* (2013.01); *G06Q 20/3278* (2013.01); *G06Q 20/363* (2013.01); *G06Q 20/40* (2013.01)

(58) Field of Classification Search
CPC ............. G06Q 20/202; G06Q 20/3278; G06Q 20/363; G06Q 20/40; G06Q 20/326;
(Continued)

(56) References Cited

U.S. PATENT DOCUMENTS 6,119,101 A 9/2000 Peckover
6,331,858 B2 12/2001 Fisher
(Continued)

FOREIGN PATENT DOCUMENTS

CN 1399216 2/2003
EP 1280115 1/2003
(Continued)

OTHER PUBLICATIONS

Coskun, V., Ok, K. and Ozdenizci, B. (2012). Secure Element Management. In Near Field Communication (eds V. Coskun, K. Ok and B. Ozdenizci). https://doi.org/10.1002/9781119965794.ch8 (Year: 2012).*
(Continued)

*Primary Examiner* — Ashford S Hayles
(74) *Attorney, Agent, or Firm* — Dority & Manning, P.A.

(57) ABSTRACT

A user conducts a wireless payment transaction with a merchant system by transmitting payment information from a user device to a terminal reader without accessing a secure element resident on the user device. A user taps a user device in a merchant system's terminal reader's radio frequency field. The terminal reader and the user device establish a communication channel and the terminal reader transmits a signal comprising a request for a payment processing response. The signal is received by the user device and converted by a controller to a request understandable by an application host processor. The controller transmits the request to the application host processor, where the request is processed, and a response is transmitted to the controller and then to the terminal reader. The response generated by the application host processor is identifiable by the merchant system as a payment response.

20 Claims, 6 Drawing Sheets

Related U.S. Application Data continuation of application No. 15/967,503, filed on Apr. 30, 2018, now Pat. No. 10,628,817, which is a continuation of application No. 14/918,536, filed on Oct. 20, 2015, now Pat. No. 9,984,360, which is a continuation of application No. 13/859,725, filed on Apr. 9, 2013, now Pat. No. 9,171,302.

(60) Provisional application No. 61/635,277, filed on Apr. 18, 2012.

(51) Int. Cl.
*G06Q 20/32* (2012.01)
*G06Q 20/36* (2012.01)

(58) Field of Classification Search
CPC .... G06Q 20/322; G06Q 20/24; G06Q 20/367; G06Q 20/38; G06Q 20/387; H04B 5/02
See application file for complete search history.

(56) References Cited

U.S. PATENT DOCUMENTS

| | | | |
|---|---|---|---|
| 6,594,692 | B1 | 7/2003 | Reisman |
| 6,980,962 | B1 | 12/2005 | Arganbright et al. |
| 7,175,079 | B1 | 2/2007 | Silverbrook et al. |
| 7,197,475 | B1 | 3/2007 | Lorenzen et al. |
| 7,225,148 | B2 | 5/2007 | Kassan |
| 7,596,513 | B2 | 9/2009 | Fargo |
| 7,890,634 | B2 | 2/2011 | Jiang et al. |
| 7,895,570 | B2 | 2/2011 | Gibson et al. |
| 7,953,642 | B2 | 5/2011 | Dierks |
| 7,975,020 | B1 | 7/2011 | Greeen et al. |
| RE43,157 | E | 2/2012 | Bishop et al. |
| 8,117,089 | B2 | 2/2012 | Minsky et al. |
| 8,196,131 | B1* | 6/2012 | von Behren .......... G06Q 20/382 705/64 |
| 8,266,001 | B2 | 9/2012 | Dierks |
| 9,171,302 | B2 | 10/2015 | Jooste |
| 2001/0019332 | A1 | 9/2001 | Fisher |
| 2002/0006126 | A1 | 1/2002 | Johnson et al. |
| 2002/0007321 | A1 | 1/2002 | Burton |
| 2002/0049637 | A1 | 4/2002 | Harman et al. |
| 2002/0055878 | A1 | 5/2002 | Burton et al. |
| 2003/0014319 | A1 | 1/2003 | Arbab et al. |
| 2003/0055792 | A1 | 3/2003 | Kinoshita et al. |
| 2003/0220881 | A1* | 11/2003 | Pirhonen ............ G06Q 20/3278 705/53 |
| 2004/0051727 | A1 | 3/2004 | Endo et al. |
| 2004/0068472 | A1* | 4/2004 | Sahota ................. G07F 7/1008 705/64 |
| 2004/0073688 | A1 | 4/2004 | Sampson |
| 2005/0097005 | A1 | 5/2005 | Fargo |
| 2005/0218211 | A1 | 10/2005 | Saso et al. |
| 2006/0047582 | A1 | 3/2006 | Jiang |
| 2006/0173754 | A1 | 8/2006 | Burton et al. |
| 2006/0293926 | A1 | 12/2006 | Khury |
| 2006/0293965 | A1 | 12/2006 | Burton |
| 2007/0114274 | A1 | 5/2007 | Gibbs et al. |
| 2007/0294182 | A1* | 12/2007 | Hammad ............. G06Q 20/085 705/64 |
| 2008/0040265 | A1 | 2/2008 | Rackley, III et al. |
| 2008/0126260 | A1 | 5/2008 | Cox et al. |
| 2008/0129450 | A1* | 6/2008 | Riegebauer ........... G07F 7/1008 340/5.86 |
| 2008/0147509 | A1 | 6/2008 | Ghosh et al. |
| 2008/0183593 | A1 | 7/2008 | Dierks |
| 2008/0208688 | A1 | 8/2008 | Byerley et al. |
| 2008/0307299 | A1 | 12/2008 | Marchant et al. |
| 2008/0319905 | A1* | 12/2008 | Carlson ................. G06Q 40/02 235/379 |
| 2009/0023476 | A1 | 1/2009 | Saarisalo et al. |
| 2009/0077091 | A1 | 3/2009 | Khen et al. |
| 2009/0098825 | A1 | 4/2009 | Huomo et al. |
| 2009/0103730 | A1* | 4/2009 | Ward ................... G06Q 20/02 380/258 |
| 2009/0200371 | A1 | 8/2009 | Kean et al. |
| 2009/0222816 | A1 | 9/2009 | Mansell et al. |
| 2009/0254450 | A1 | 10/2009 | Bollay |
| 2009/0276347 | A1 | 11/2009 | Kargman et al. |
| 2009/0307142 | A1* | 12/2009 | Mardikar ........... G06Q 20/3821 705/72 |
| 2010/0114773 | A1 | 5/2010 | Skowronek |
| 2010/0153721 | A1 | 6/2010 | Mellqvist |
| 2010/0210300 | A1 | 8/2010 | Rizzo et al. |
| 2010/0211422 | A1* | 8/2010 | Zanzot ................ G06Q 20/102 705/40 |
| 2010/0291904 | A1* | 11/2010 | Musfeldt ............. H04L 41/5041 455/414.1 |
| 2010/0330904 | A1* | 12/2010 | Stougaard ............... H04L 67/12 455/41.1 |
| 2011/0078079 | A1 | 3/2011 | Shin |
| 2011/0191252 | A1 | 8/2011 | Dai |
| 2011/0244796 | A1* | 10/2011 | Khan ...................... H04W 4/80 455/41.1 |
| 2011/0312271 | A1 | 12/2011 | Ma et al. |
| 2012/0011228 | A1* | 1/2012 | Corda ............... H04M 1/72412 709/219 |
| 2012/0016731 | A1 | 1/2012 | Smith et al. |
| 2012/0028609 | A1 | 2/2012 | Hruska |
| 2012/0064828 | A1* | 3/2012 | Khan ................... H04W 12/069 455/41.1 |
| 2012/0072309 | A1 | 3/2012 | Hultberg et al. |
| 2012/0109764 | A1* | 5/2012 | Martin ................... G06Q 20/20 705/17 |
| 2012/0116902 | A1* | 5/2012 | Cardina ................ G06Q 20/10 705/17 |
| 2012/0123883 | A1 | 5/2012 | Charrat |
| 2012/0124394 | A1 | 5/2012 | Brudnicki et al. |
| 2012/0129452 | A1* | 5/2012 | Koh ................... G06Q 20/352 455/41.1 |
| 2012/0130839 | A1* | 5/2012 | Koh ................... G06Q 20/3552 705/26.1 |
| 2012/0143768 | A1 | 6/2012 | Hammad et al. |
| 2012/0209749 | A1 | 8/2012 | Hammad et al. |
| 2012/0246075 | A1* | 9/2012 | Rasti ................... H04L 63/0884 705/44 |
| 2012/0265685 | A1 | 10/2012 | Brudnicki et al. |
| 2012/0284194 | A1 | 11/2012 | Liu et al. |
| 2012/0317628 | A1* | 12/2012 | Yeager ................ G06Q 20/352 726/5 |
| 2013/0036050 | A1 | 2/2013 | Giordano et al. |
| 2013/0041822 | A1 | 2/2013 | Wagner et al. |
| 2013/0052949 | A1* | 2/2013 | Yang ....................... H04W 4/80 455/41.1 |
| 2013/0054412 | A1 | 2/2013 | Brendell et al. |
| 2013/0054473 | A1* | 2/2013 | Jan ..................... G06Q 20/3223 705/64 |
| 2013/0054474 | A1 | 2/2013 | Yeager |
| 2013/0073404 | A1 | 3/2013 | Narendra et al. |
| 2013/0086375 | A1 | 4/2013 | Lyne et al. |
| 2013/0097041 | A1 | 4/2013 | Fisher |
| 2013/0103514 | A1* | 4/2013 | Fisher ................... G06Q 20/202 705/18 |
| 2013/0110658 | A1* | 5/2013 | Lyman ................ G06Q 20/36 705/41 |
| 2013/0151400 | A1 | 6/2013 | Makhotin et al. |
| 2013/0160134 | A1 | 6/2013 | Marcovecchio et al. |
| 2013/0166402 | A1* | 6/2013 | Parento ................ G06Q 20/385 705/21 |
| 2013/0204793 | A1* | 8/2013 | Kerridge .............. G06Q 20/202 705/67 |
| 2013/0226812 | A1 | 8/2013 | Landrok et al. |
| 2013/0246268 | A1* | 9/2013 | Moshfeghi ......... G06Q 20/3278 705/44 |
| 2013/0282502 | A1 | 10/2013 | Jooste |
| 2013/0303085 | A1* | 11/2013 | Boucher ............... H04W 12/069 455/41.1 |
| 2014/0006276 | A1 | 1/2014 | Grigg et al. |
| 2014/0058937 | A1* | 2/2014 | Watson .............. G06Q 20/425 705/41 |

(56) References Cited

U.S. PATENT DOCUMENTS

| | | | |
|---|---|---|---|
| 2014/0196118 A1 | 6/2014 | Weiss | |
| 2014/0250006 A1* | 9/2014 | Makhotin | G06Q 20/326 705/41 |
| 2015/0020160 A1* | 1/2015 | Goncalves | G06Q 20/352 726/3 |
| 2015/0026067 A1 | 1/2015 | Abifaker | |
| 2015/0032524 A1* | 1/2015 | Fisher | H04W 8/205 705/14.23 |
| 2015/0066670 A1 | 3/2015 | Wentker et al. | |
| 2015/0112860 A1* | 4/2015 | Wang | G06Q 20/322 705/39 |
| 2015/0186864 A1* | 7/2015 | Jones | G06Q 20/3278 705/39 |
| 2015/0222729 A1* | 8/2015 | Singh | G06Q 20/326 709/203 |
| 2015/0327071 A1* | 11/2015 | Sharma | H04W 12/12 726/6 |
| 2016/0016733 A1* | 1/2016 | Lert | B65G 1/1373 414/807 |
| 2016/0042338 A1 | 2/2016 | Jooste | |
| 2016/0057619 A1* | 2/2016 | Lopez | H04W 12/041 380/247 |
| 2016/0140535 A1* | 5/2016 | Noe | G06Q 20/3574 705/39 |

FOREIGN PATENT DOCUMENTS

| | | |
|---|---|---|
| JP | 2001067396 | 3/2001 |
| JP | 2001344545 | 12/2001 |
| JP | 2003036406 | 2/2003 |
| JP | 2003150885 | 5/2003 |
| JP | 2005050263 | 2/2005 |
| JP | 2005285054 | 10/2005 |
| JP | 2006004264 | 1/2006 |
| JP | 2006501584 | 1/2006 |
| JP | 2006106988 | 4/2006 |
| JP | 2006309489 | 11/2006 |
| JP | 2009048507 | 3/2009 |
| JP | 2009211698 | 9/2009 |
| JP | 2011060291 | 3/2011 |
| KR | 1020000036568 | 7/2000 |
| KR | 1020000072125 | 12/2000 |
| KR | 1020020024356 | 3/2002 |
| KR | 1020030011578 | 2/2003 |
| KR | 20060109303 | 10/2006 |
| KR | 100822160 | 4/2008 |
| KR | 1020080102439 | 11/2008 |
| KR | 1020100135268 | 12/2010 |
| KR | 1020110010880 | 2/2011 |
| KR | 1020120011347 | 2/2012 |
| WO | WO0057332 | 9/2000 |
| WO | WO2010126509 | 11/2010 |
| WO | WO2011050309 | 4/2011 |
| WO | WO2011112158 | 9/2011 |
| WO | WO2013158419 | 10/2013 |

OTHER PUBLICATIONS

Blass, Erik-Oliver et al. "PSP: Private and Secure Payment with RFID." Proceedings of the 8th ACM Workshop on Privacy in the Electronic Society. ACM, 2009. 51-60. Web. (Year: 2009).*

Martínez, Jesúus, Luis R López, and Pedro Merino. "Application-Oriented Middleware for E-Commerce." Middleware for Communications. Chichester, UK: John Wiley & Sons, Ltd, 2004. 393-412. Web. (Year: 2004).*

F. Cheng, "A Trusted Smart Phone and its Applications in Electronic Payment," 2010 International Forum on Information Technology and Applications, Kunming, China, 2010, pp. 405-408, doi: 10.1109/IFITA.2010.256. (Year: 2010).*

W. D. Chen, G. P. Hancke, K. E. Mayes, Y. Lien and J. -H. Chiu, "Using 3G network components to enable NFC mobile transactions and authentication," 2010 IEEE International Conference on Progress in Informatics and Computing, Shanghai, China, 2010, pp. 441-448, doi: 10.1109/PIC.2010.5687587. (Year: 2010).*

R. N. Akram, K. Markantonakis and K. Mayes, "User Centric Security Model for Tamper-Resistant Devices," 2011 IEEE 8th International Conference on e-Business Engineering, Beijing, China, 2011, pp. 168-177, doi: 10.1109/ICEBE.2011.69. (Year: 2011).*

Beal, "Google Checkout Open, Ready for Business", Ecommerce-Guide, Jun. 28, 2006, 1 page.

Chismar, "The Home Depot Unveils New App Version—iPhone 3/2 & Android 3/1", Feb. 6, 2012, 3 pages.

European Search report for EP 13777837.9, dated Jun. 12, 2015, 2 pages.

Google Inc., "Release Notes for Google Checkout XML API Developers Guide", Jun. 23, 2010, 25 pages.

International Preliminary Report on Patentability for Application No. PCT/US2013/035865, dated Oct. 30, 2014, 8 pages.

International Search Report and Written Opinion for PCT/US2013/035865, dated Jul. 23, 2013, 11 pages.

Office Action for AU 2013204110, dated Oct. 16, 2013, 3 pages.
Office Action for CA 2869208, dated Nov. 25, 2014, 13 pages.
Office Action for CN 201380020679.4, dated Oct. 9, 2016, 26 pages.
Office Action for EP 13777837.9, dated Jun. 26, 2015, 6 pages.
Office Action for JP 2015-507048, dated Mar. 30, 2015, 11 pages.
Office Action for JP 2017-238671, dated Jan. 28, 2019, 20 pages.
Office Action for JP 2017-238671, dated Jul. 22, 2018, 14 pages.
Office Action for KR 10-2014-7029025, dated Jul. 7, 2015, 8 pages.
Office Action for KR 10-2014-7029025, dated Mar. 9, 2015, 11 pages.
Office Action for KR 10-2016-7029349, dated Jan. 2, 2017, 6 pages.
Office Action for U.S. Appl. No. 13/859,725, dated Jan. 15, 2015, 24 pages.
Office Acton for AU 2013204110, dated Jun. 3, 2014, 4 pages.
Ryan, "Home Depot Offers Buy Online, Pick Up or Return In-Store Service", Home Improvement Blog—The Apron by Home Depot, Aug. 31, 2014, 14 pages.

Walmart, "Walmart-Site to Store Web Search", Nov. 12, 2010, 1 page.

* cited by examiner

PROCESSING PAYMENT TRANSACTIONS WITHOUT A SECURE ELEMENT

RELATED APPLICATION

This patent application is a continuation of and claims priority to U.S. patent application Ser. No. 16/853,344, filed Apr. 20, 2020 and entitled "Processing Payment Transactions without A Secure Element," which is a continuation of and claims priority to U.S. patent application Ser. No. 15/967,503, filed Apr. 30, 2018 and entitled "Processing Payment Transactions without A Secure Element," which is a continuation of and claims priority to U.S. patent application Ser. No. 14/918,536, filed Oct. 20, 2015 and entitled "Processing Payment Transactions without A Secure Element," which is a continuation of and claims priority to U.S. patent application Ser. No. 13/859,725, filed Apr. 9, 2013 and entitled "Processing Payment Transactions without A Secure Element," which claims priority under 35 U.S.C. § 119 to U.S. Patent Application No. 61/635,277, filed Apr. 18, 2012 and entitled "Processing a Contactless Payment Transaction Without a Secure Element." The entire contents of the above-identified applications are hereby fully incorporated herein by reference.

TECHNICAL FIELD

The present disclosure relates generally to a payment transaction, and more particularly to a payment transaction made via a user computing device without accessing a secure element of the user device.

BACKGROUND

Current near field communication ("NFC") systems rely on a hardware component commonly referred to as a "secure element" installed on communication devices to provide a secure operating environment for financial transactions, transit ticketing, identification and authentication, physical security access, and other functions. A secure element generally includes its own operating environment with a tamper-proof microprocessor, memory, and operating system. An NFC controller receives a payment request message from a merchant's point of sale ("POS") system and transmits the message to the secure element for processing. A typical NFC controller comprises the secure element. A trusted service manager ("TSM"), or other form of secure service provider, can, among other things, install, provision, and personalize applications and data in the secure element. The secure element has one or more access keys that are typically installed at manufacture time. A corresponding key is shared by the TSM so that the TSM can establish a cryptographically secure channel to the secure element for installation, provisioning, and personalization of the secure element while the device having the secure element is in the possession of an end user. In this way, the secure element can remain secure even if the host CPU in the device has been compromised.

One deficiency with current NFC systems is that a tight coupling exists between the secure element and the TSM. For current deployments, only one TSM has access to the keys of a particular secure element. Therefore, the end user can choose to provision secure element features that are supplied by the one TSM only. The manufacturer of the device typically chooses this TSM. For example, a smart phone manufacturer may select the TSM for smart phones under guidance from a mobile network operator ("MNO"), such as Sprint or Verizon, that purchases the smart phone rather than the end user. Thus, the TSM features available to the end user may not be in the end user's interest. As an example, the MNO may have a business relationship with only one payment provider, such as MasterCard or Bank of America. That TSM may allow the secure element to be provisioned with payment instructions from the one payment provider only. Thus, the end user would not be able to access services from other payment providers, such as VISA.

SUMMARY

In certain example aspects described herein, a method for processing a payment transaction without accessing the secure element comprises a terminal reader that facilitates a communication channel with a user device. A user taps the user device in the terminal reader's radio frequency field. The terminal reader and the user device establish a communication channel, and the terminal reader transmits a signal comprising a request for a payment processing response. The signal is received by the user device and converted by a controller to a request understandable by the application host processor. The controller transmits the request to the application host processor, where the request is processed and a response is transmitted to the controller and then to the terminal reader. The response generated by the application host processor is identifiable by the merchant system as a payment response and is indistinguishable from, or provides the same functionality as, a response generated by a conventional secure element.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
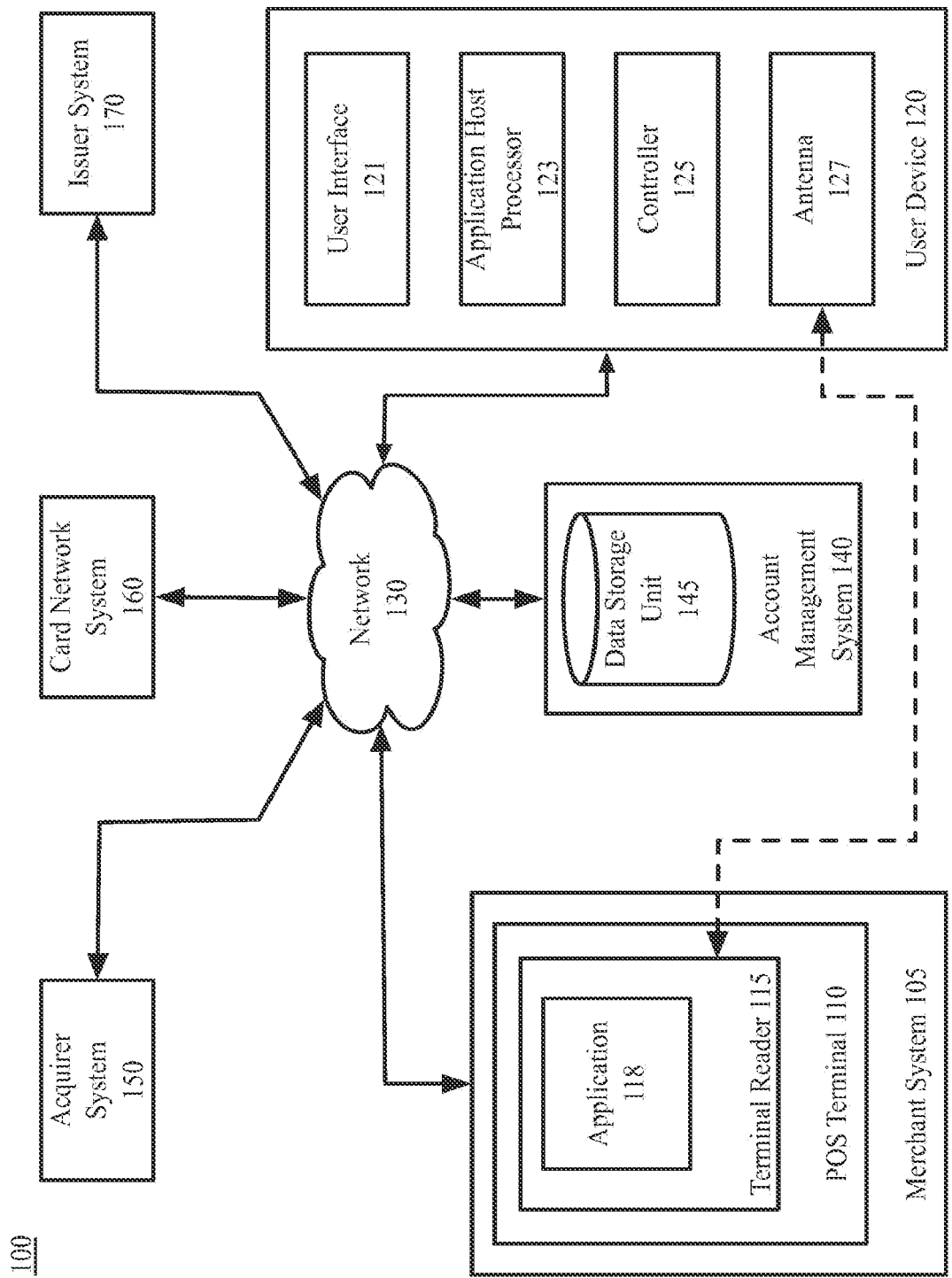
FIG. 1 is a block diagram depicting a payment processing system, in accordance with example embodiments.

The example embodiments described herein provide methods and systems that enable processing of a payment transaction without accessing a secure element of a user device. In an example embodiment, the user is conducting a wireless payment transaction with a merchant system by transmitting payment information from the user device to a terminal reader. The secure element resident on the user device may be tightly coupled to a TSM at the time of manufacturer, thereby preventing the user from providing payment instructions for a payment account not provisioned on the secure element. In an example embodiment, the user device comprises an application host processor capable of transmitting payment information without accessing the secure element.

A user taps the user device in the terminal reader's radio frequency field. The terminal reader and the user device establish a communication channel and the terminal reader transmits a signal comprising a request for a payment processing response. The signal is received by the user device and converted by the controller to a request understandable by the application host processor. The controller transmits the request to the application host processor, where the request is processed and a response is generated. The response generated by the application host processor is identifiable by the merchant system as a payment response and is indistinguishable from a response generated by the secure element. The response is transmitted by the application host processor to the controller, where it is converted into a signal for transmission to the terminal reader. The signal is transmitted to the terminal reader where it is received and transmitted to the merchant system. An application resident on the merchant system processes the signal and converts it to a response understandable by the merchant system. The merchant system reads the response, which comprises an affirmative indication that the user device can proceed with the payment transaction.

The merchant system generates a request for payment information and transmits the request to the terminal reader. The terminal reader transmits the request in the form of a signal transmittable via the communication channel established between the terminal reader and the user device. The signal is received by the user device and converted by the controller to a request understandable by the application host processor. The controller transmits the request to the application host processor, where the request is processed and a response is generated. The response comprises a payment account number to use for the transaction. The payment account number may comprise a number associated with a financial account associated with the user, for example, a credit account number, debit account number, stored value account number, gift card account number, coupon, loyalty account number, reward account number, or bank account number. The response may also or instead comprise a proxy account number generated by an account management system or the application host processor. The proxy account number comprises information that routes the payment transaction to the account management system where the user's actual financial account information can be retrieved. The proxy account numbers may have time, geographic and/or value limitations. The proxy account numbers may also have limitations on the number of times they may be used.

The response, which comprises the payment account information, is transmitted by the application host processor to the controller, where it is converted into a signal for transmission to the terminal reader. The signal is transmitted to the terminal reader where it is received and transmitted to the merchant system. An application resident on the merchant system processes the signal and converts it to a response understandable by the merchant system. The merchant system reads the payment account information and processes the payment.

The inventive functionality of the invention will be explained in more detail in the following description, read in conjunction with the figures illustrating the program flow.

Example System Architectures

Turning now to the drawings, in which like numerals indicate like (but not necessarily identical) elements throughout the figures, example embodiments are described in detail.

FIG. 1 is a block diagram depicting a payment processing system, in accordance with certain example embodiments. As depicted in FIG. 1, the example operating environment 100 comprises a merchant system 105, a user device system 120, an account management system 140, an acquirer system 150, a card network system 160, and an issuer system 170 that are configured to communicate with one another via one or more networks 130. In some example embodiments, two or more of these systems (including systems 105, 120, 140, 150, 160, and 170) are integrated into the same system.

Each network 130 includes a wired or wireless telecommunication means by which network systems (including systems 105, 120, 140, 150, 160, and 170) can communicate and exchange data. For example, each network 130 can be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, near field communication network (NFC), any form of standardized radio frequency, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example embodiment, NFC communication protocols include, but are not limited to ISO/IEC 14443 type A and/or B technology (hereafter "ISO 14443"), MIFARE technology (hereafter "MIFARE"), and/or ISO/IEC 18092 technology (hereafter "ISO 18092"). ISO 14443 is a communication protocol for user devices operating in close proximity with a reader. An ISO 14443 communication protocol is utilized for secure card payments, including but not limited to credit card payments, debit card payments, and other forms of financial card payments. MIFARE is a communication protocol for user devices that comply with proprietary device standards that are based on ISO 14443. A MIFARE protocol is utilized for stored function transactions, including but not limited to gift cards, transit cards, tickets, access cards, loyalty cards, and other forms of stored value card transactions. A MIFARE protocol may also be used for limited value-added services. ISO 18092 is a communication protocol for user devices operating at higher bit rates, allowing for richer communication between the devices. An ISO 18092 communication protocol is utilized for peer-to-peer communication, value-added services (including, but not limited to, coupons, loyalty cards, check-ins, membership cards, gift cards, and other forms of value-added services), and other forms of richer communication. Any suitable NFC communication protocol can be used for NFC communication between the user device 120 and the terminal reader 115 to implement the methods and functionality described herein.

In an example embodiment, each network system (including systems 105, 120, 140, 150, 160, and 170) comprises a device having a communication module capable of transmitting and receiving data over the network 130. For example, each network system (including systems 105, 120, 140, 150, 160, and 170) may comprise a server, personal computer, mobile device (for example, notebook computer, tablet computer, netbook computer, personal digital assistant (PDA), video game device, GPS locator device, cellular telephone, Smartphone, or other mobile device), a television with one or more processors embedded therein and/or coupled thereto, or other appropriate technology that includes or is coupled to a web browser or other application for communicating via the network 130. In the example embodiment depicted in FIG. 1, the network systems (including systems 105, 120, 140, 150, 160, and 170) are operated by merchants, users or consumers, an account management system operator, acquirer system operator, card network system operator, and issuer system operator, respectively.

The merchant system 105 comprises at least one point of sale ("POS") terminal 110 that is capable of processing a purchase transaction initiated by a user. In an example embodiment, the merchant operates an online store and the user indicates a desire to make a purchase by clicking a link or "checkout" button on a website. In some example embodiments, the user device 120 is configured to perform the functions of the POS terminal 110. In this example, the user scans and/or pays for the transaction via the user device 120 without interacting with the POS terminal 110. An example merchant system 105 comprises at least a terminal reader 115 that is capable of communicating with the user device system 120 and a merchant POS terminal 110 via an application 118. The application 118 may be an integrated part of the POS terminal 110 or merchant system 105 (not shown in FIG. 1), an integrated part of the terminal reader 115 (shown), or a standalone hardware device (not shown), in accordance with some example embodiments.

In an example embodiment, the terminal reader 115 is capable of communicating with the user device 120 using an NFC communication method. In another example embodiment, the terminal reader 115 is capable of communicating with the user device 120 using a Bluetooth communication method. In yet another embodiment, the terminal reader 115 is capable of communicating with the user device 120 using a Wi-Fi communication method. In some example embodiments, the user scans a QR code or bar code or clicks a URL link on the user device 120, which temporarily associates the user device 120 to the online merchant system 105. The POS terminal 110 queries the online merchant system 105 to link to the user and/or user device 120. In an example embodiment, the terminal reader 115 may be configured to read any number of barcode formats, including without limitation, a QR code, a universal product code ("UPC"), a global trade item number ("GTIN"), a stock keeping unit ("SKU"), a Japanese article number ("JAN"), a world product code ("WPC"), an International Standard Book Number ("ISBN"), a European Article Number ("EAN"), etc. According to other example embodiments, terminal reader 115 may be an electronic field generator with a CPU, a laser scanner, a charged-coupled device ("CCD") reader, a camera-based reader, an omni-directional bar code scanner, a camera, a RFID reader, or any other device that is capable of reading product identifier information in a merchant system 105.

In an example embodiment, the user device 120 may be a personal computer, mobile device (for example, notebook computer, tablet computer, netbook computer, personal digital assistant ("PDA"), video game device, GPS locator device, cellular telephone, Smartphone or other mobile device), television with one or more processors embedded therein and/or coupled thereto, or other appropriate technology that can communicate via an electronic, magnetic, or radio frequency field between the device 120 and another device, such as a terminal reader 115. In an example embodiment, the user device 120 has processing capabilities, such as storage capacity/memory and one or more applications (not illustrated) that can perform a particular function. In an example embodiment, the user device 120 contains an operating system (not illustrated) and user interface 121. In some example embodiments, the user device 120 comprises an operating system (not illustrated) that communicates through an audio port or auxiliary data port without a user interface 121.

The user device 120 also comprises a controller 125. In an example embodiment, the controller 125 is an NFC controller. In some example embodiments, the controller 125 is a Bluetooth link controller. The Bluetooth link controller may be capable of sending and receiving data, performing authentication and ciphering functions, and directing how the user device 120 will listen for transmissions from the terminal reader 115 or configure the user device 120 into various power-save modes according to the Bluetooth-specified procedures. In another example embodiment, the controller 125 is a Wi-Fi controller or an NFC controller capable of performing similar functions.

The user device 120 communicates with the terminal reader 115 via an antenna 127. In an example embodiment, once a user device application has been activated and prioritized, the controller 125 is notified of the state of readiness of the user device 120 for a transaction. The controller 125 outputs through the antenna 127 a radio signal, or listens for radio signals from the device reader 115. On establishing a secure communication channel between the user device 120 and the terminal reader 115, the reader 115 requests a payment processing response from the user device 120.

An example controller 125 receives a radio wave communication signal from the terminal reader 115 transmitted through the antenna 127. The controller 125 converts the signal to readable bytes. In an example embodiment, the bytes comprise digital information, such as a request for a payment processing response or a request for payment card information. The controller 125 transmits the request to the application host processor 123.

An example user device 120 may comprise a secure element or secure memory (not shown), which can exist within a removable smart chip or a secure digital ("SD") card or which can be embedded within a fixed chip on the device 120. In certain example embodiments, Subscriber Identity Module ("SIM") cards may be capable of hosting a secure element, for example, an NFC SIM Card. The secure element (not shown) allows a software application resident on the user device 120 and accessible by the device user to interact securely with certain functions within the secure element, while protecting information stored within the secure element (not shown). In an example embodiment, the secure element (not shown) comprises components typical of a smart card, such as crypto processors and random generators. In an example embodiment, the secure element (not shown) comprises a Smart MX type NFC controller in a highly secure system on a chip controlled by a smart card operating system, such as a JavaCard Open Platform ("JCOP") operating system. In another example embodiment, the secure element (not shown) is configured to include a non-EMV type contactless smart card, as an optional implementation. The secure element (not shown) communicates with the application in the user device 120. In an example embodiment, the secure element (not shown) is capable of storing encrypted user information and only allowing trusted applications to access the stored information. In an example embodiment, a controller 125 interacts with a secure key encrypted application for decryption and installation in the secure element.

In an example user device 120, a payment request is processed by the application host processor 123, instead of by a secure element (not shown). An example application host processor 123 can exist within a removable smart chip or a secure digital ("SD") card or which can be embedded within a fixed chip on the device 120. The application host processor may comprise applications (not shown) running thereon that perform the functionality described herein. In an example embodiment, the user device 120 communicates payment account information to the merchant system 105 in the form of a proxy or virtual account identifier, without transmitting the user's actual account information. The user's actual account information is maintained by the account management system 140 instead of within a secure element (not shown) resident on the user device 120.

An example merchant system 105 and user device 120 communicate with the account management system 140. The account management system 140 enables the storage of one or more payment accounts for the user. In an example embodiment, the user registers one or more payment accounts, for example, credit card accounts, debit accounts, bank accounts, gift card accounts, coupons, stored value accounts, loyalty accounts, rewards accounts, and other forms of payment accounts capable of making a purchase with the account management system 140. For example, the user may create a digital wallet account with the account management system 140. The payment accounts may be associated with the user's digital wallet account maintained by the account management system 140. The user may access the digital wallet account at any time to add, change or remove payment accounts. In an example embodiment, the user's digital wallet information is transmitted to the user's user device 120, enabling use of the user's payment account without accessing the account management system 140. In some example embodiments, the account management system 140 transmits limited-use proxy account information to the user device 120 enabling use of the payment accounts during a payment transaction routed to the account management system 140 during the payment processing. For example, the proxy account number may route the payment authorization request to the account management system 140, acting as the issuer system 170 for the proxy account. In another example embodiment, the user device 120 may comprise an application (not shown) that generates limited use proxy account numbers that are enable the payment transaction to be routed to the account management system 140. In some example embodiments, the application host processor 123 performs this function.

An example account management system 140 comprises a data storage unit 145 accessible by the account management system 140. The example data storage unit 145 can include one or more tangible computer-readable storage devices capable of storing a user's payment account information. The user may request a purchase from the merchant system 105. In an example embodiment, the purchase is initiated by a wireless "tap" of the user device 120 with the terminal reader 115. The merchant system 105 interacts with the acquirer system 150 (for example Chase, PaymentTech, or other third party payment processing companies), the card network system 160 (for example VISA, MasterCard, American Express, Discover, or other card processing networks), and the issuer system 170 (for example Citibank, CapitalOne, Bank of America, and other financial institutions to authorize payment) to process the payment. In some example embodiments, the payment card information transmitted by the user device 120 to the terminal reader 115 is a proxy account number or a token account number that links the payment transaction to a user account maintained by the account management system 140. The payment transaction is routed to the account management system 140 for identification of the user's correct payment card information.

Figure 2:
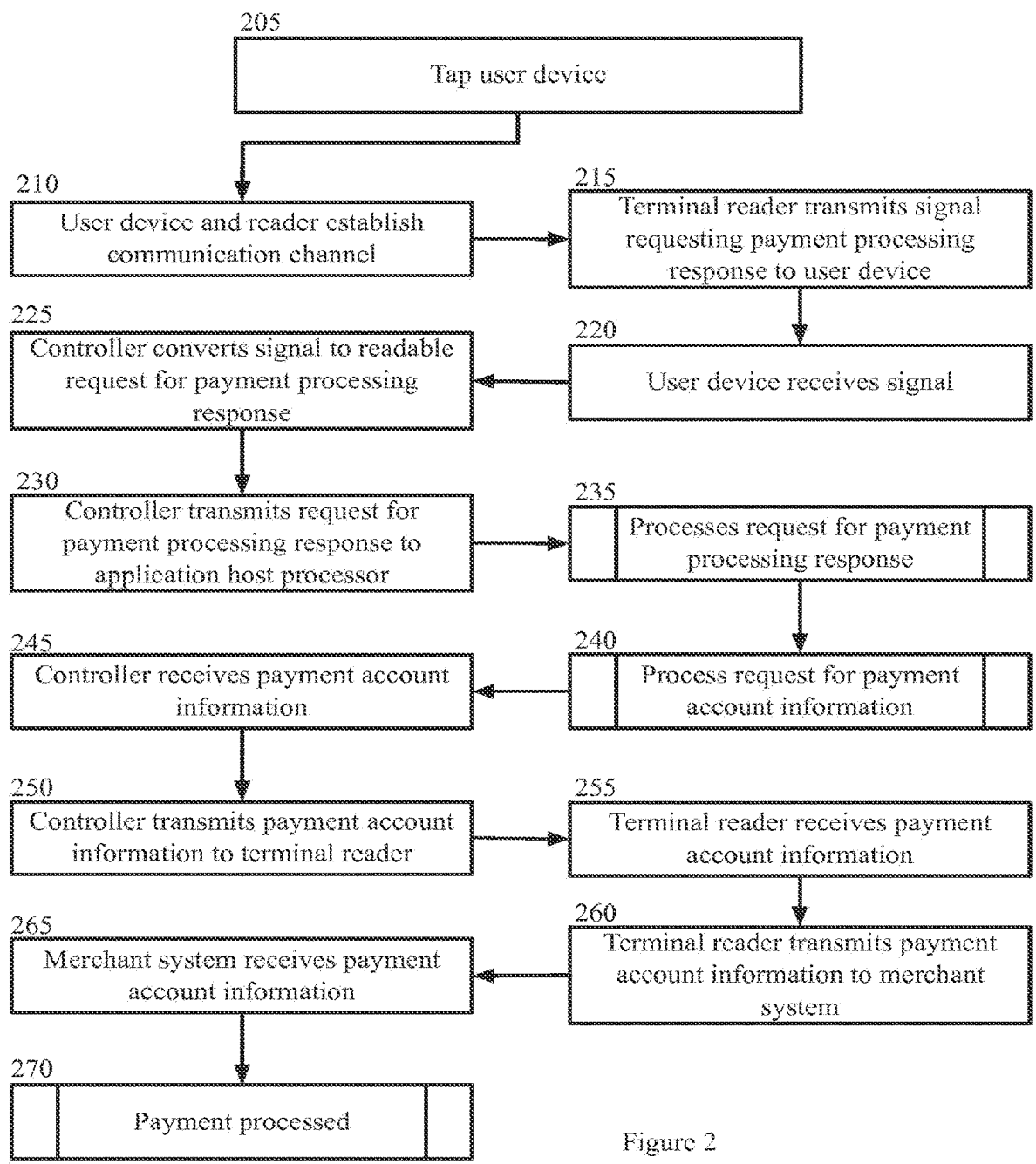
FIG. 2 is a block flow diagram depicting a method for processing a payment without accessing the secure element, in accordance with example embodiments.

The components of the example-operating environment 100 arc described hereinafter with reference to the example methods illustrated in FIGS. 2-5. The example methods of FIG. 2-5 may also be performed with other systems and in other environments. Example System Processes FIG. 2 is a block flow diagram depicting a method for processing a payment without accessing the secure element, in accordance with example embodiments. The method 200 is described with reference to the components illustrated in FIG. 1.

In block 205, the user taps the user device 120 in the proximity of the terminal reader 115. In an example embodiment, the terminal reader 115 generates a radio frequency ("RF") or other field polling for the presence of a user device 120, and the user "taps" the user device 120 by placing the device 120 within the field of the terminal reader 115. In some example embodiments, the merchant activates the RF field or other field to poll for the presence of a user device 120 using an application 118 on the terminal reader 115. In certain example embodiments, the systems and methods described in FIGS. 2-5 herein are performed while the user device 120 is tapped.

In block 210, the user device 120 and the terminal reader 115 establish a communication channel. In an example embodiment, the communication channel is an NFC communication channel. In some example embodiments, the communication channel is a Bluetooth communication channel. In yet another example embodiment, the communication channel is a Wi-Fi communication channel. Accordingly, the payment transaction can be conducted via wireless or "contactless" communication between the user device 120 and the terminal reader 115.

In an example embodiment, the terminal reader 115 requests protocols and characteristics from the user device 120 to establish the communication channel. For example, the terminal reader 115 may request the identification of communication protocols (for instance ISO/IEC 14443, MIFARE, and/or ISO/IEC 18092), a list of applications available, and security protocols from the user device 120.

In block 215, the terminal reader 115 transmits a signal requesting a payment processing response to the user device 120. In an example embodiment, the payment process response is a request to proceed with a financial payment transaction. In an example embodiment, the payment process response indicates to the terminal reader 115 that the user device 120 is capable of performing a financial transaction. In a typical wireless payment transaction involving a secure element, the user device 120 responds to the terminal reader's 115 request with a message created by the secure element. This message is understandable by the terminal reader 115 to comprise a payment process response. In an example embodiment, a payment process response is created by the application host processor 123 resident in the user device 120, not the secure element. The payment process response is understandable by the terminal reader 115 in the same manner as a response created by the secure element.

In block 220, the user device 120 receives the signal transmitted by the terminal reader 115. In an example embodiment, the signal is received by the antenna 127 and transmitted to the controller 125. In an example embodiment, the tap is an NFC tap and the controller 125 is an NFC controller.

In block 225, the controller 125 converts the signal into a readable request for the payment processing response. In an example embodiment, signal is converted into bytes comprising the readable request for the payment processing response.

In block 230, the controller 125 transmits the request for the payment processing response to the application host processor 123. In an example embodiment, the application host processor 123 functions in a manner similar to a secure element during the payment transaction.

In block 235, the request for the payment processing response is processed. The method for processing the request for the payment processing response is described in more detail hereinafter with reference to the methods described in FIG. 3.

Figure 3:
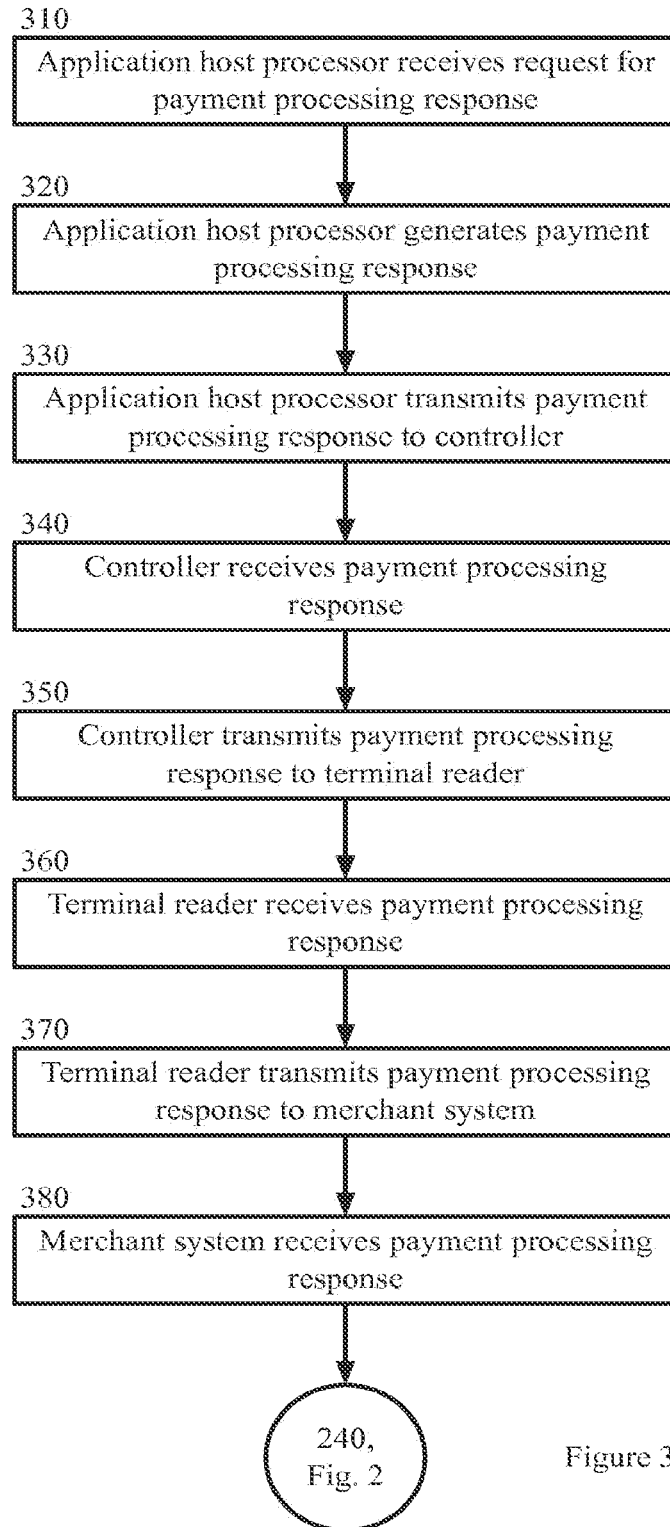
FIG. 3 is a block flow diagram depicting a method for processing a payment processing response, in accordance with example embodiments.

FIG. 3 is a block flow diagram depicting a method for processing a payment processing response, in accordance with example embodiments, as referenced in block 235 of FIG. 2. The method 235 is described with reference to the components illustrated in FIG. 1.

In block 310, the application host processor 123 receives the request for the payment processing response. In an example embodiment, the request is transmitted through a series of connections before being received by the application host processor 123. In some example embodiments, the request is transmitted directly from the controller 125 to the application host processor 123.

In block 320, the application host processor 123 generates the payment processing response. In an example embodiment, the payment processing response comprises language understandable by the terminal reader 115 indicating that the user device 120 is capable of completing a payment transaction. In an example embodiment, the payment processing response comprises the same language and/or information as a payment processing response generated by a conventional secure element or secure memory. In an example embodiment, the payment processing response comprises user identifiable data, personal identifiers, account identifiers, payment network configuration data, merchant specific data, and/or security data, any of which may used to validate the sequence of transactions performed on a user's account.

In block 330, the application host processor 123 transmits the payment processing response to the controller 125. In an example embodiment, payment processing response is transmitted through a series of connections before being received by the controller 125. In some example embodiments, the payment processing response is transmitted directly to the controller 125.

In block 340, the controller 125 receives the payment processing response. In an example embodiment, the payment processing response comprises bytes that will be converted by the controller 125 into a transmittable signal.

In block 350, the controller 125 transmits the payment processing response to the terminal reader 115. In an example embodiment, the payment processing response is a signal transmitted by the antenna 127 to the terminal reader 115.

In block 360, the terminal reader 115 receives the payment processing response. In an example embodiment, the terminal reader 115 receives the signal transmitted by the user device.

In block 370, the terminal reader transmits the payment processing response to the merchant system 105. In an example embodiment, the payment processing response is transmitted to the POS terminal 110 resident in the merchant system 105.

In block 380, the merchant system 105 receives the payment processing response. In an example embodiment, the application 118 resident on the merchant system converts the signal into a language understandable by the merchant system 105. In an example embodiment, the merchant system 105 understands the payment processing response to comprise an affirmative response that the user device 120 is capable of performing the payment transaction.

The method 235 then proceeds to block 240 in FIG. 2.

Returning to FIG. 2, in block 240, a request for payment account information is processed. The method for processing the payment account information is described in more detail hereinafter with reference to the methods described in FIG. 4.

Figure 4:
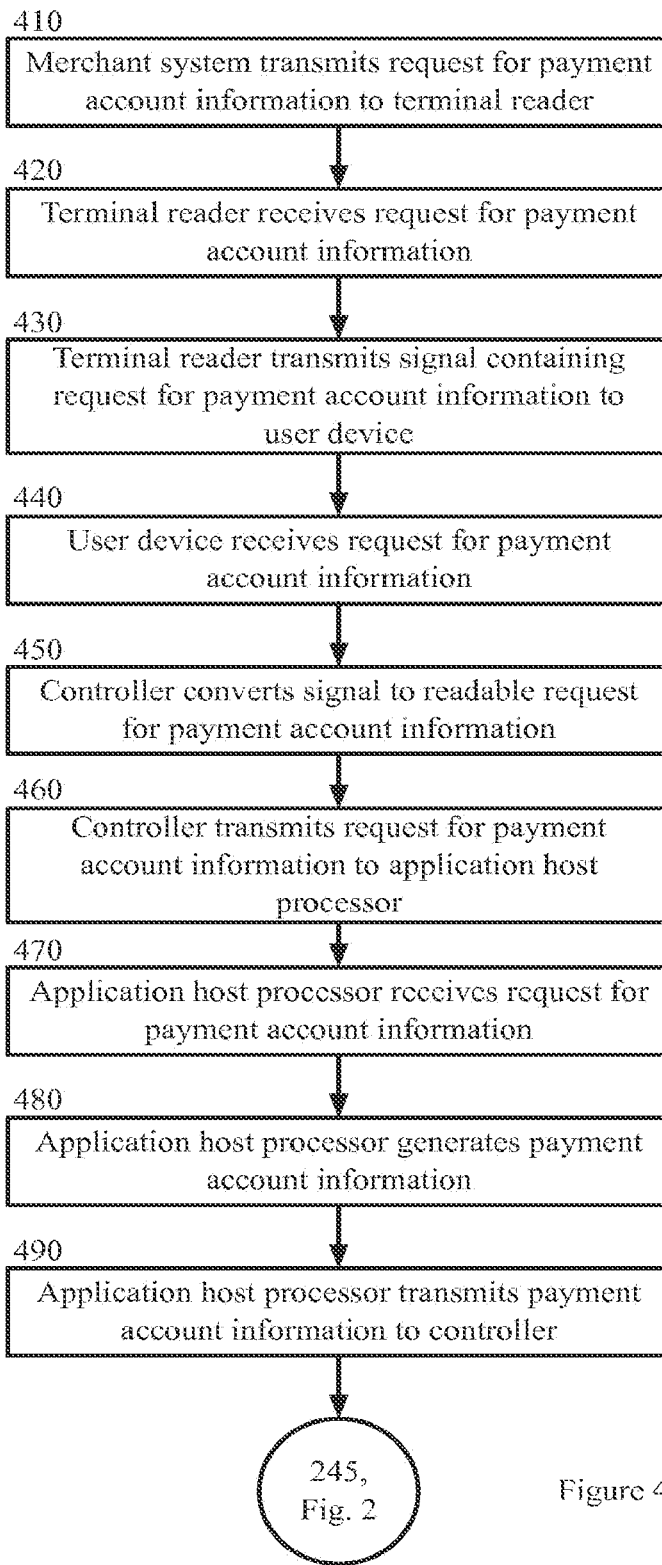
FIG. 4 is a block flow diagram depicting a method for processing a request for payment information, in accordance with example embodiments.

FIG. 4 is a block flow diagram depicting a method for processing a request for payment information, in accordance with example embodiments, as referenced in block 240 of FIG. 2. The method 240 is described with reference to the components illustrated in FIG. 1.

In block 410, the merchant system 105 generates and transmits a request for payment account information to the terminal reader 115. In an example embodiment, the request for a payment processing response comprises a request for payment account information and the methods described in blocks 410 through 490 and in block 240 through 265 are not required.

In block 420, the terminal reader 115 receives the request for payment account information transmitted by the merchant system 105. In an example embodiment, the application 118 resident on the merchant system 105 reads the payment processing response and generates a request for payment account information in response. In an example embodiment, the request is converted to a signal capable of being transmitted to the user device 120 via the communication channel and converted into bytes understandable by the application host processor 123.

In block 430, the terminal reader 115 transmits a signal comprising the request for payment account information to the user device 120. In an example embodiment, the request for payment account information comprises a request for information to complete a payment transaction, such as the account number, the expiration date, and the security code.

In block 440, the user device 120 receives the signal transmitted by the terminal reader 115. In an example embodiment, the signal is received by the antenna 127 and transmitted to the controller 125.

In block 450, the controller 125 converts the signal into a readable request for the payment account information. In an example embodiment, signal is converted into bytes comprising the readable request for the payment account information.

In block 460, the controller 125 transmits the request for the payment account information to the application host processor 123. In an example embodiment, the application host processor 123 functions in a manner similar to a secure element during the payment transaction.

In block 470, the application host processor 123 receives the request for the payment account information. In an example embodiment, the request is transmitted through a series of connections before being received by the application host processor 123. In some example embodiments, the request is transmitted directly from the controller 125 to the application host processor 123.

In block 480, the application host processor 123 generates the payment account information to be used for the payment transaction. In an example embodiment, the user registers one or more payment accounts, for example, credit card accounts, debit accounts, bank accounts, gift card accounts, coupons, stored value accounts, loyalty accounts, rewards accounts, and other forms of payment accounts capable of making a purchase with the account management system 140. For example, the user may create a digital wallet account with the account management system 140, which associates the payment accounts with the user and/or the user's user device 120. The digital wallet account information can be stored in the account management system 140 and also may be stored locally in the user's user device 120.

In an example embodiment, the user's digital wallet information was transmitted to the user's user device 120, and the application host processor 123 generates the payment account information by accessing the user's payment accounts saved in the user's digital wallet account. In this embodiment, the application host processor 123 can select a particular payment account to use in the payment transaction.

In some example embodiments, the account management system 140 transmits one or more limited use proxy account numbers to the user device 120. The application host processor 123 generates the payment account information by accessing the transmitted limited use proxy account numbers and selecting a particular proxy account number to use for the transaction. In an example embodiment, the account management system 140 may periodically generate a limited use proxy account number and update the user's user device 120 with the current number. In some example embodiments, the user's user device 120 can communicate a request for a limited use proxy account number to the account management system 140, and the account management system 140 can, in response, communicate the limited use proxy account number to the user's user device 120 for use in the payment transaction. In yet another example embodiment, the application host processor 123 generates the proxy account number locally. The application host processor 123 can communicate the generated limited use proxy account number to the account management system 140 for verification by the account management system 140 when the account management system 140 receives the payment request from the merchant system 105. In some example embodiments, the application host processor can generate the limited use proxy account number using a scheme that can be replicated by the account management system 140 to allow the account management system 140 to verify the generated limited use proxy account number when the account management system 140 receives the payment request from the merchant system 105.

The proxy account numbers may have time or geographic limitations. For example, the proxy account number may only be valid for a limited amount of time or it may only be valid in a specific geographic location. The limited use proxy account number can be stamped with, have encoded therein, or otherwise contain a time reference, a time duration, a geographic position of the user device 120, and/or a geographic region based on a geographic position of the user device 120. These features can allow the limited use proxy account number to expire after a specified period of time or when used outside of a specified geographic location. The proxy account numbers may also have limitations on the number of times they may be used. For example, each proxy account number may only be valid for a single use.

In block 490, the application host processor 123 transmits the payment account information to the controller 125. In an example embodiment, payment account information is transmitted through a series of connections before being received by the controller 125. In some example embodiments, the payment processing response is transmitted directly to the controller 125.

The method 240 then proceeds to block 245 in FIG. 2.

Returning to FIG. 2, in block 250, the controller 125 receives the payment account information. In an example embodiment, the payment account information comprises bytes that will be converted by the controller 125 into a transmittable signal.

In block 250, the controller 125 transmits the payment account information to the terminal reader 115. In an example embodiment, the payment account information is a signal transmitted by the antenna 127 to the terminal reader 115.

In block 255, the terminal reader 115 receives the payment account information. In an example embodiment, the terminal reader 115 receives the signal transmitted by the user device 120.

In block 260, the terminal reader transmits the payment processing response to the merchant system 105. In an example embodiment, the payment processing response is transmitted to the POS terminal 110 resident in the merchant system 105.

In block 265, the merchant system 105 receives the payment account information. In an example embodiment, the application 118 resident on the merchant system 105 converts the signal into a language understandable by the merchant system 105. In an example embodiment, the user may be prompted to enter a personal identification number ("PIN") into the merchant system 105.

In block 270, the payment is processed. The methods for processing the payment are described in more detail hereinafter with reference to the methods described in FIG. 5.

Figure 5:
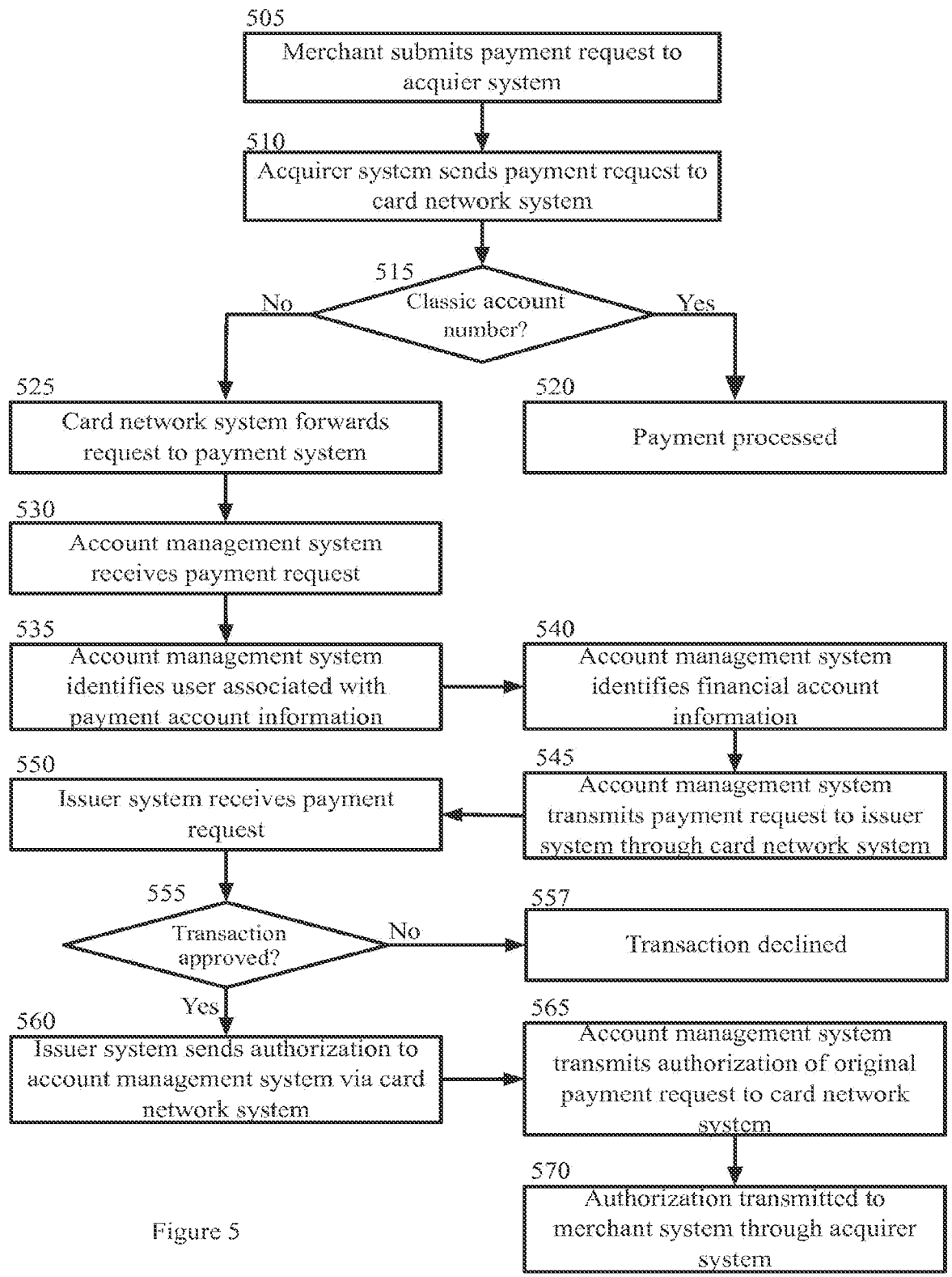
FIG. 5 is a block flow diagram depicting a method for processing a payment, in accordance with example embodiments.

FIG. 5 is a block flow diagram depicting a method for processing a payment, in accordance with example embodiments, as referenced in block 270 of FIG. 2. The method 270 is described with reference to the components illustrated in FIG. 1

In block 505, the merchant system 105 generates a payment request message to request payment using the payment account information provided by the user device 120 and submits the payment request to the acquirer system 150. In an example embodiment, the merchant's POS terminal 110 submits the request to the acquirer system 150 via a network 130.

In block 510, the acquirer system 150 receives the payment request and submits it to the card network system 160.

In block 515, the card network system 160 determines whether the payment account information used to pay for the transaction is a classic account number. In an example embodiment, the card network system 160 automatically makes this determination using a series of numbers or routing information in the payment account information. In some example embodiments, the card network system 160 reviews a list of saved account identification information provided to the card network system 160 by the account management system 140.

If the account number is a classic account number, the payment is processed according to traditional payment processing methods, in block 520. In an example embodiment, the account number is a classic payment account if it is capable of being routed to the issuer system without processing by the account management system 140 (for example, if the user device 120 transmitted the user's actual credit card account number, debit card account number, stored value account number, gift card account number, or bank account number to the merchant system 105).

Returning to block 515, if the account number is not a classic account number, the issuer system 170 is the account management system 140 (for example, if the proxy account information was used for the transaction). The card network system 160 then forwards the payment request to the account management system 140, in block 525.

In some example embodiments, the payment account information can comprise an identifier that corresponds to the list of saved account identification information, such as a block of account numbers or other indicia, which identifies the issuer system 170 or the account management system 140. Based on this identifier, the payment is processed according to traditional payment processing methods, in block 520, if the identifier corresponds to a conventional issuer system 170, or the payment is forwarded to the account management system 140, in block 525, if the identifier corresponds to the account management system 140.

In some example embodiments, the methods described in reference to blocks 515 and 525 may be performed by the acquirer system 150 or the issuer system 170, instead of the card network system 160.

In block 530, the account management system 140 receives the payment request from the card network system 160.

In block 535, the account management system 140 identifies the user associated with the proxy account information. In an example embodiment, account management system 140 contains a list of the proxy account information generated for each user and can map this information to the user's digital wallet account. some example embodiments, a one-way algorithm, such as a hash function, can be used to identify or associate the user's digital wallet account with the proxy account information. In yet another example embodiment, a hardware security module ("HSM") can be used to store secured data, such as a list of the proxy account information generated for each user. The HSM can be contacted by the account management system 140 over a secure network to map the list of proxy account information generated for each user to the user's digital wallet account.

In an example embodiment, the account management system 140 verifies that the limitation rules for the proxy account information have not been violated. For example, the account management system 140 confirms that the proxy number has not violated a time/geographic limitation or a limitation on the number of uses.

In block 540, the account management system 140 identifies the user's saved payment account information. In an example embodiment, the user's digital wallet account contains the rules defined by the user (or the default rules if the user has not modified the default rules). If the user has defined payment rules, the account management system 140 applies the user-defined rules first to determine the order to apply the payment accounts to the transaction. In an example embodiment, the account management system 140 applies the user-defined rules first.

In block 545, the account management system 140 generates and transmits a new payment request to the issuer system 170 of the selected payment account via the card network system 160. In some example embodiments, the account management system 140 is the issuer system 170 of the payment account. In this embodiment, the account management system 140 will determine whether sufficient funds are available for the transaction and approve/deny the transaction accordingly.

In block 550, issuer 170 receives the new payment request from the account management system 140.

In block 555, the issuer 170 approves or declines the transaction. If the transaction is declined, in block 557 the account management system 140 is notified of the declined transaction. The account management system 140 notifies the merchant system 105 of the declined transaction.

If the transaction is approved, the issuer system 170 transmits an authorization message to the account management system 140 via the card network system 160, in block 560. If the account management system 140 is the issuer system 170 of the payment account (see block 515), the account management system 140 notes the authorization of the transaction.

In block 565, the account management system 140 receives the authorization message and transmits an approval of the original payment request to the card network system 160.

In block 570, the authorization message is transmitted to the merchant system 105 through the acquirer system 150.

In an example embodiment, the communication channel between the terminal reader 115 and the user device 120 is then terminated. In an example embodiment, the original communication channel can be terminated when the request to terminate a communication channel between the terminal reader 115 and the user device 120 is communicated, or any suitable time thereafter.

Other Example Embodiments

Figure 6:
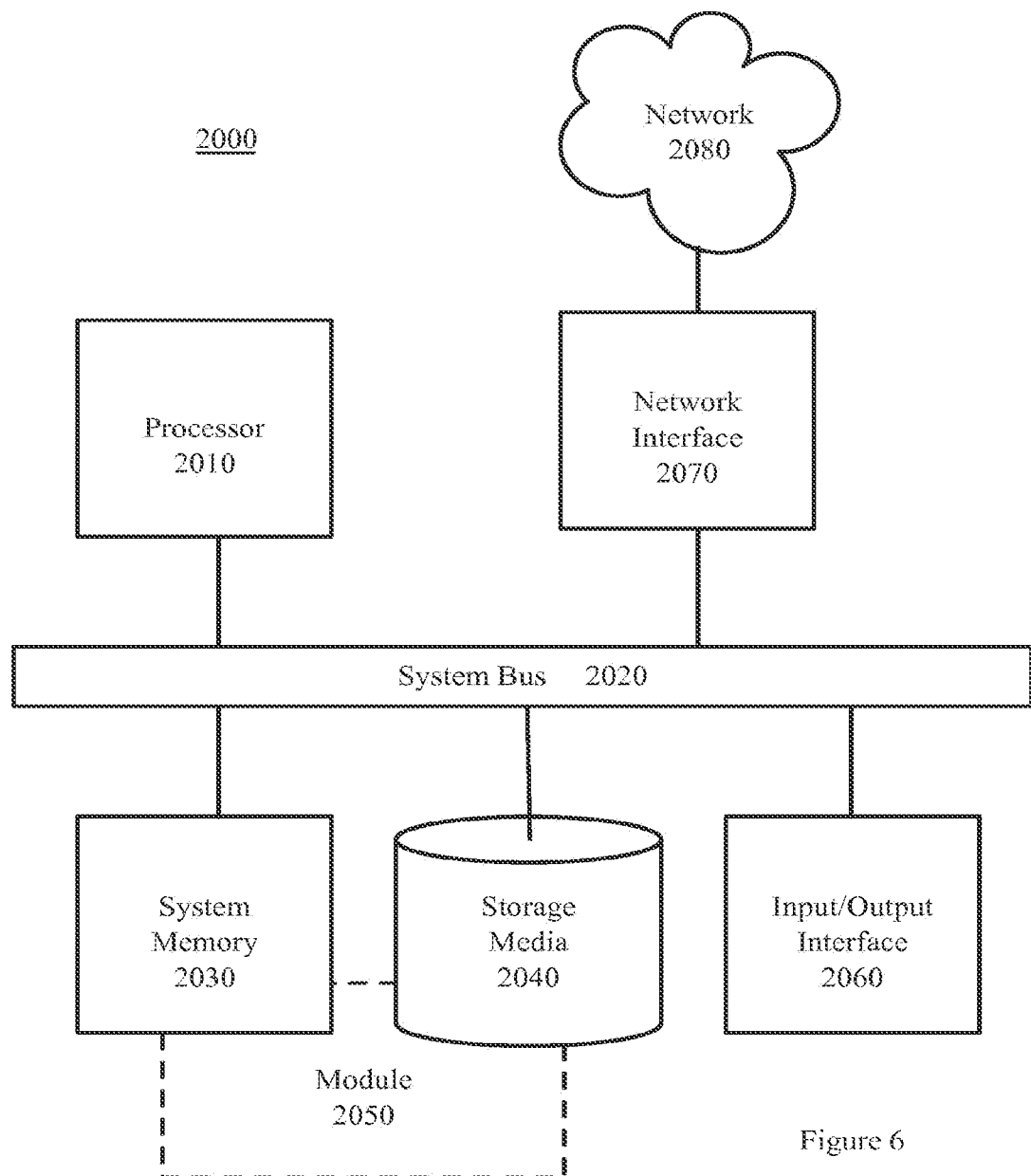
FIG. 6 is a block diagram depicting a computer machine and module, in accordance with certain example embodiments.

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a Smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The 110 interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor

2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to process payment transactions without accessing secure memories, comprising:

receiving, by a mobile computing device and from a merchant system computing device, a request for payment account information to process a payment transaction;

converting, by the mobile computing device, the request for the payment account information to a request readable by a non-secure memory processor of the mobile computing device;

generating, by the non-secure memory processor of the mobile computing device, a response to the request for the payment account information that is identifiable by the merchant system as a payment response generated by a secure memory processor; and transmitting, by the mobile computing device, the response to the request for the payment account information to the merchant system computing device.

2. The computer-implemented method of claim 1, wherein converting the request for the payment account information to the request readable by the non-secure memory processor comprises:

converting the request for the payment account information to a readable request for a payment processing response by the non-secure memory processor of the mobile computing device.

3. The computer-implemented method of claim 1, wherein converting, by the mobile computing device, the request for the payment account information to the request readable by the non-secure memory processor comprises converting the request for the payment account information into bytes comprising the request readable by the non-secure memory processor.

4. The computer-implemented method of claim 1, wherein the response to the request for the payment account information provides a same functionality as a response created by the secure memory processor.

5. The computer-implemented method of claim 1, wherein the response to the request for the payment account information is indistinguishable from a response created by the secure memory processor.

6. The computer-implemented method of claim 1, wherein the response to the request for the payment account information comprises a payment account identifier.

7. The computer-implemented method of claim 6, wherein the payment account identifier is generated by an account management system and transmitted to the mobile computing device, wherein the account management system maintains an account comprising information for at least one of a credit card account, debit account, stored value account, gift card account, and bank account for a user associated with the mobile computing device.

8. The computer-implemented method of claim 6, wherein the payment account identifier is associated with at least one of a geographic limitation, a time limitation, or a number of use limitation.

9. The computer-implemented method of claim 6, wherein the payment account identifier is retrieved from a digital wallet application on the mobile computing device.

10. The computer-implemented method of claim 1, wherein the request for the payment account information is received using a near field communication (NFC) protocol.

11. The computer-implemented method of claim 6, further comprising communicating, by the mobile computing device, the payment account identifier to an account management system for payment account identifier verification during processing of a payment request.

12. The computer-implemented method of claim 6, wherein the non-secure memory processor resident on the mobile computing device generates the payment account identifier using a scheme that can be replicated by an account management system during processing of a payment request.

13. The computer-implemented method of claim 1, wherein:
generating, by the non-secure memory processor of the mobile computing device, the response to the request for the payment account information comprises allowing the mobile computing device to process payment transactions using financial account information for any of a plurality of payment providers without transferring control of a secure memory processor from one payment provider to a different payment provider.

14. One or more non-transitory computer-readable media having computer-readable program instructions embodied thereon that when executed by a mobile computing device cause the mobile computing device to perform operations, the operations comprising:
receiving, by a mobile computing device and from a merchant system computing device, a request for payment account information to process a payment transaction;
converting, by the mobile computing device, the request for the payment account information to a request readable by a non-secure memory processor of the mobile computing device; and
generating, by the non-secure memory processor of the mobile computing device, a response to the request for the payment account information that is identifiable by the merchant system as a payment response generated by a secure memory processor.

15. The one or more non-transitory computer-readable media of claim 14, wherein:

the response to the request for the payment account information comprises a payment account identifier; and
the payment account identifier is generated by an account management system and transmitted to the mobile computing device, wherein the account management system maintains an account comprising information for at least one of a credit card account, debit account, stored value account, gift card account, and bank account for a user associated with the mobile computing device.

16. The one or more non-transitory computer-readable media of claim 15, wherein the operations further comprise communicating, by the mobile computing device, the payment account identifier to the account management system for payment account identifier verification during processing of a payment request.

17. A mobile computing device for processing payment transactions, comprising:
a storage device;
a controller communicatively coupled to the storage device; and
a processor communicatively coupled to the storage device and the controller, the controller of the mobile computing device executing application code instructions that are stored in the storage device to cause the mobile computing device to:
receive a request for payment account information to process a payment transaction from a merchant system computing device; and
convert the request for the payment account information to a request readable by the processor; and
the processor of the mobile computing device executing application code instructions that are stored in the storage device to cause the mobile computing device to:
generate a response to the request for the payment account information that is identifiable as a response created by a secure element processor, the response comprising a payment account identifier.

18. The mobile computing device of claim 17, wherein the payment account identifier is generated by a non-secure memory processor.

19. The mobile computing device of claim 17, wherein the storage device comprises a secure memory other than a secure element memory.

20. The mobile computing device of claim 17, wherein the storage device comprises a combination memory with secure memory and non-secure memory portions.

* * * * *